3,657,284
DYESTUFFS
Gerald Booth and Trevor James Smith, Manchester, and Cyril Eric Vellins, Gatley, England, assignors to Imperial Chemical Industries Limited, London, England
No Drawing. Continuation-in-part of application Ser. No. 663,547, Aug. 28, 1967. This application Nov. 24, 1970, Ser. No. 92,528
Claims priority, application Great Britain, Sept. 2, 1966, 39,319/66
Int. Cl. C09b 1/32, 1/56
U.S. Cl. 260—378          1 Claim

ABSTRACT OF THE DISCLOSURE

Anthraquinone dyestuffs which are half sulphuric esters of compounds of the formula:

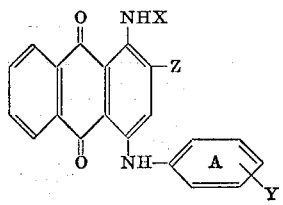

wherein the aromatic nucleus A may be substituted by halogen, lower alkyl or lower alkoxy in addition to the substituent Y;

X represents hydrogen, lower alkyl, cyclohexyl or benzyl;
Y represents hydroxy lower alkyl, hydroxy lower alkoxy lower alkyl or hydroxy lower alkylthio; and
Z represents hydrogen, halogen or lower alkyl.

The dyestuffs give fast blue shades on nylon.

---

This application is a continuation-in-part of our copending application Ser. No. 663,547, filed Aug. 28, 1967, now abandoned.

This invention relates to new dyestuffs and more particularly to new dyestuffs of value for the dyeing of polyamides.

It has been found that half sulphuric esters, and water-soluble salts thereof, a certain substituted diamino-anthraquinones containing hydroxyl-substituted groups are of special value for the dyeing of polyamides. These water-soluble dyestuffs give bright reddish-blue to greenish-blue dyeings which possess good wet and light fastness properties and also give good coverage of fibre irregularities.

According to the invention there are provided new dyestuffs which are half sulphuric esters of compounds of the formula:

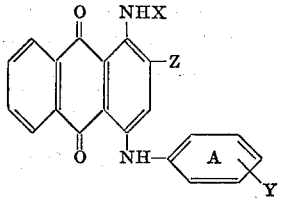

wherein the aromatic nucleus A may be substituted by halogen, lower alkyl or lower alkoxy in addition to the substituent Y:

X represents hydrogen, lower alkyl, cyclohexyl or benzyl;
Y represents hydroxy lower alkyl, hydroxy lower alkoxy lower alkyl or hydroxy lower alkylthio; and
Z represents hydrogen, halogen or lower alkyl.

The dyestuffs of the present invention are of particular usefulness in the form of water-soluble salts, particularly sodium, potassium, ammonium, amine or quaternary ammonium salts.

As examples of lower alkyl groups which may be represented by X there may be mentioned particularly methyl, ethyl, propyl, isopropyl and butyl but also amyl and hexyl.

As examples of hydroxy lower alkyl, hydroxy lower alkoxy lower alkyl and hydroxy lower alkylthio groups which may be represented by Y there may be mentioned hydroxymethyl, β-hydroxyethyl, γ-hydroxypropyl, hydroxyethoxymethyl, hydroxyethoxyethyl and β-hydroxyethylthio groups.

As examples of halogen atoms which may be represented by Z there may be mentioned chlorine and bromine and as examples of lower alkyl groups which may be so represented there may be mentioned methyl, ethyl, propyl and butyl groups.

Other substituents in addition to Y which may be present on aromatic nucleus A include halogen atoms, for example chlorine and bromine, lower alkyl groups, for example methyl, ethyl, propyl and butyl groups and lower alkoxy groups, for example methoxy, ethoxy, propoxy and butoxy groups.

The new dyestuffs of the present invention may be prepared by conventional methods, for example by reacting the corresponding hydroxy compounds with a sulphating agent, for example concentrated sulphuric acid, weak oleum or chlorosulphonic acid.

The hydroxy compounds may be prepared by methods conventional to the synthesis of dyestuffs in the antroquinone series, for example by replacement of α-halogeno atoms with arylamines containing a hydroxy-substituted group starting, for example, from 1-methylamino-4-bromoanthraquinone or from 1-amino - 4 - bromoanthraquinone-2-sulphonic acid with subsequent desulphonation.

According to a further feature of the invention there is provided a process for the dyeing of polyamides which comprises treating the polyamide with an aqueous solution of a dyestuff as hereinbefore defined.

As polyamides there may be mentioned polyhexamethylene adipamide and polycaprolactam.

The polyamide may be in any suitable form, for example fibre, filament, staple, yarn, film or sheet or may be in the form of fabric or other textile articles.

The polyamide may be treated at any convenient temperature and preferably between 80 and 100° C. Temperatures above 100° C. may be used at superatmospheric pressure if desired. Acid salts such as ammonium acetate or acids such as acetic acid or other conventional auxiliary agents may be added if desired.

The invention is illustrated but not limited by the following examples in which all parts and percentages are by weight unless otherwise stated.

EXAMPLE 1

A mixture of 31.6 parts of 1 - methylamino - 4 - bromoanthraquinone, 36 parts of 4 - β - hydroxyethylaniline, 16 parts of potassium acetate, 0.8 part of copper acetate and 80 parts of butyl alcohol is stirred and heated at the boiling point for 5 hours. After cooling to room temperature, 50 parts of methyl alcohol are added and the mixture is stirred for several hours. The solid is filtered off and washed with 500 parts of methyl alcohol, 250 parts of water, and dried at 70° C. The 1 - methylamino - 4 - (4' - β - hydroxyethylanilino)anthraquinone so obtained is added with stirring to 82 parts of 96% sulphuric acid at a temperature between 0 and 5° C. The solution is stirred for 4 hours at 0 to 5° C. and for 4 hours at 15 to 20° C. and then slowly poured into 1500 parts of ice and water. The product is filtered off and stirred in 1000 parts of water made alkaline to Brilliant Yellow paper by the addition of sodium carbonate. 20 parts of sodium chloride are added and the precipitated product is filtered off and dried at 70° C. The resultant dyestuff dyes polyamide materials in attractive greenish blue shades possessing good wet and light fastness properties.

In place of the 31.6 parts of 1-methylamino-4-bromoanthraquinone used in the above example there are used 34.4 parts of 1 - isopropylamino - 4 - bromoanthraquinone when a similar dyestuff is obtained, having excellent affinity for polyamide materials, which is coloured in attractive greenish blue shades having good wet and light fastness properties.

In place of the 36 parts of 4 - β - hydroxyethylaniline used in the above example there are used 44 parts of 4 - β - hydroxyethylthioaniline whereby the sodium salt of the half sulphuric ester of 1 - methylamino - 4 - (4'- β - hydroxyethylthioanilino)anthraquinone is obtained, which dyes polyamide materials in greenish-blue shades having good wet and light fastness properties.

EXAMPLE 2

5 parts of 1 - amino - 4 - (3' - β - hydroxyethoxymethyl- 4' - methylanilino)anthraquinone are added with stirring to 25 parts of 96% sulphuric acid at 0 to 5° C. The solution is stirred at 0 to 5° C. for 4 hours and 15 to 20° C. for 4 hours and then slowly poured into 500 parts of ice and water. The product is filtered off and stirred in 300 parts of water made alkaline to Brilliant Yellow paper with sodium carbonate. 30 parts of sodium chloride are added and the precipitated product is filtered off and dried at 70° C. The dyestuff colours polyamide materials in blue shades having good wet and light fastness properties.

The 1 - amino - 4 - (3' - β - hydroxyethoxymethyl- 4' - methylanilino)anthraquinone used in the above example was itself prepared as follows:

A mixture of 20 parts of the sodium salt of 1 - amino- 4 - bromoanthraquinone - 2 - sulphonic acid, 18 parts of 3 - β - hydroxyethoxymethyl - 4 - methylaniline, 9 parts of sodium bicarbonate, 0.5 part of copper sulphate, 0.5 part of cuprous chloride, 400 parts of water and 200 parts of ethyl alcohol is stirred for 16 hours at 65 to 70° C. The mixture is then acidified to Congo Red paper with hydrochloric acid and the precipitated product is filtered off, washed with dilute hydrochloric acid, and dried. 8 parts of sodium hydrosulphite are added to a solution of 12 parts of the sodium salt of 1 - amino - 4- (3' - β - hydroxyethoxymethyl - 4' - methylanilino)anthraquinone - 2 - sulphonic acid so obtained in 400 parts of water at 35 to 40° C., and the resulting mixture is stirred for 15 minutes at 35 to 40° C. 8 parts of sodium m-nitrobenzenesulphonate are then added followed by an aqueous solution of sodium hydroxide to maintain the pH of the mixture at 9 to 10, and the mixture is stirred for ½ hour at 35 to 40° C. The precipitated 1- amino - 4 - (3' - β - hydroxyethoxymethyl - 4' - methylanilino)anthraquinone is filtered off, washed well with water and dried.

A number of other dyestuffs prepared in a similar manner are listed in the following table.

The dyestuffs are half sulphuric esters of compounds of the general formula:

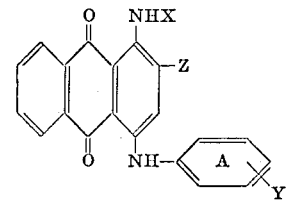

and are identified in the table by the substituents.

| Example Number | X | Y | Z | Other substituents in A | Shade |
|---|---|---|---|---|---|
| 3 | H | 4'-C₂H₄OH | H | | Blue. |
| 4 | Isopropyl | 4'-SC₂H₄OH | H | | Greenish-blue |
| 5 | Cyclohexyl | 4'-C₂H₄OH | H | | Do. |
| 6 | Benzyl | 4'-SC₂H₄OH | H | | Do. |
| 7 | H | 4'-C₂H₄OH | Methyl | | Reddish-blue. |
| 8 | H | 4'-C₂H₄OH | Br | | Blue. |
| 9 | Methyl | 3'-CH₂OH | H | 4'-methoxy | Greenish-blue |
| 10 | do | 3'-CH₂OH | H | 4'-methyl | Do. |
| 11 | do | 3'-CH₂OH | H | 4'-Cl | Do. |

We claim:
1. Anthraquinone dyestuffs which are half sulphuric esters of compounds of the formula:

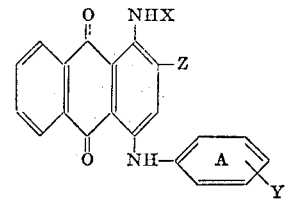

wherein the aromatic nucleus A may be substituted by halogen, lower alkyl or lower alkoxy in addition to the substituent Y;

X represents hydrogen, lower alkyl, cyclohexyl or benzyl;

Y represents hydroxy lower alkyl, hydroxy lower alkoxy lower alkyl or hydroxy lower alkylthio; and Z represents hydrogen, halogen or lower alkyl.

oxy lower alkyl or hydroxy lower alkylthio; and Z represents hydrogen, halogen or lower alkyl.

References Cited
UNITED STATES PATENTS 3,549,660  12/1970  Vellins _____ 260—379

OTHER REFERENCES

Chemisches Zentralblatt 1938, pp. 1668–9.

LORRAINE A. WEINBERGER, Primary Examiner

R. GERSTL, Assistant Examiner

U.S. Cl. X.R.

8—39; 260—381